March 31, 1970     J. O. L'ESPERANCE     3,504,255
SPEED CONTROL FOR INDUCTION MOTORS
Filed Oct. 25, 1966     2 Sheets-Sheet 1
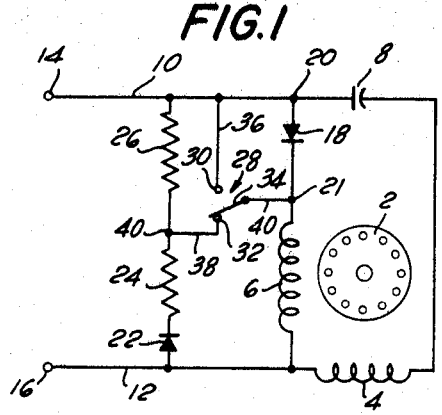
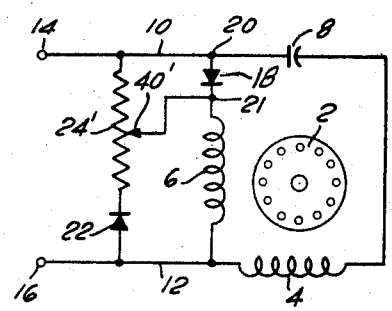
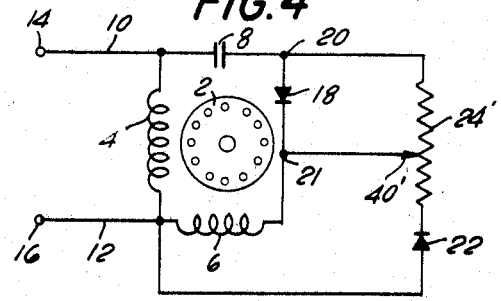
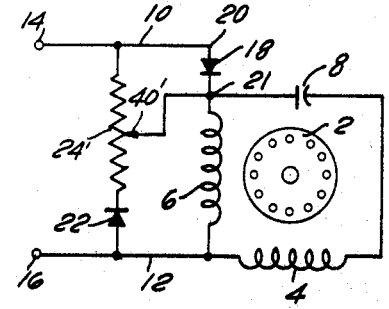
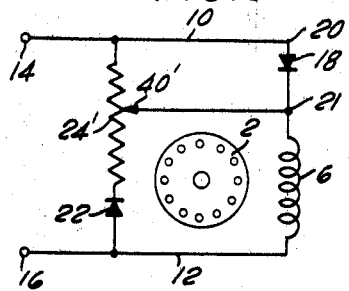
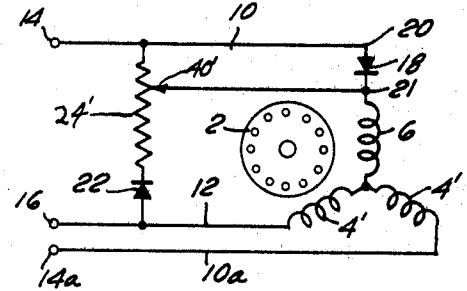
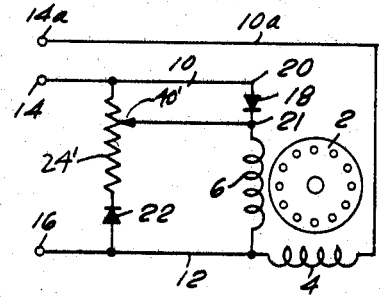
INVENTOR.
JOSEPH O. L'ESPERANCE
BY *James and Franklin*
ATTORNEYS United States Patent Office 3,504,255
Patented Mar. 31, 1970

3,504,255
SPEED CONTROL FOR INDUCTION MOTORS
Joseph O. L'Esperance, Norwood, Mass., assignor to Holtzer-Cabot Corporation, Boston, Mass., a corporation of Delaware
Filed Oct. 25, 1966, Ser. No. 589,306
Int. Cl. H02p 7/62
U.S. Cl. 318—227                                    12 Claims

ABSTRACT OF THE DISCLOSURE

A speed control system for an induction motor utilizes a rectifier means serially connected with a field winding for energization on alternate half cycles and a second rectifier in shunt with the winding for providing flyback for the motor. A voltage derived from the flyback rectifier is applied to the motor winding during other half cycles.

Figure 8:
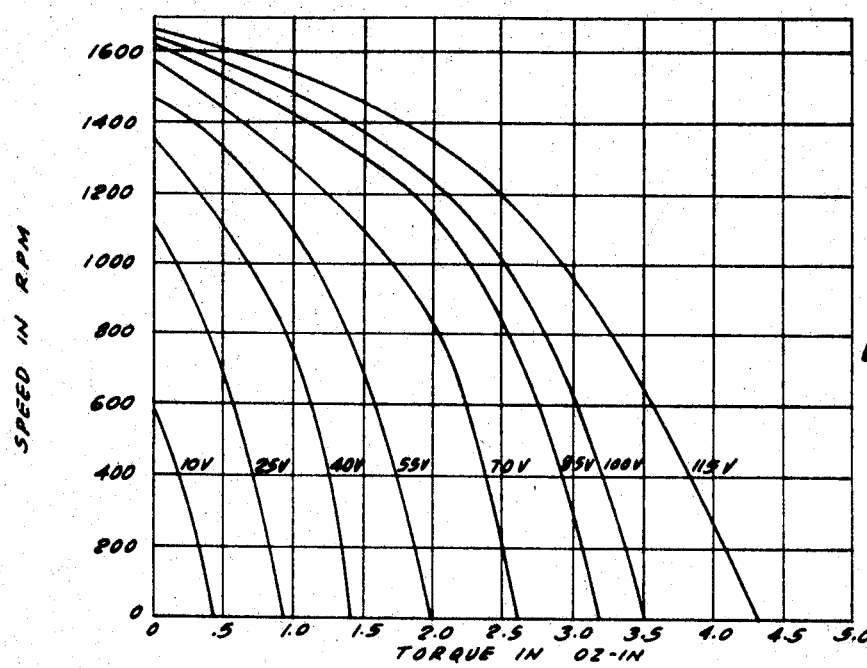

The present invention relates to a system for controlling the speed of induction motors, and in particular for accomplishing that result with only a minimal diminution in starting torque.

It is known that the speed of operation of an induction motor can be varied by changing the AC voltage applied to a field winding of the motor. There are two significant drawbacks to this procedure. In the first place, the apparatus required to controllably vary the AC voltage—either a variable transformer or equivalent electrical or electronic circuitry—is generally bulky and costly. In the second place, speed control through the variation of the applied AC voltage is accompanied by a very marked reduction in starting torque as the voltages, and the nominal operating speeds associated therewith, are reduced. The diminution in starting torque is quite appreciable even for a relatively small decrease in applied AC voltage, and consequently the areas in which this type of speed control can be employed satisfactorily are quite limited.

It is the prime object of the present invention to devise a system for the speed control of induction motors which is not subject to the above disadvantages, and which in particular gives rise to a highly improved speed-torque characteristic when compared with prior art methods of speed control, and accomplishes this result by means of simple and inexpensive circuitry.

In accordance with the present invention, means are provided for energizing a winding of the induction motor from an AC source, but energizing it fully only during all or a part of every other half-cycle thereof. During the intervening half-cycle, when the winding in question is not being fully energized (this term including energization from none at all to something less than full energization), there is a tendency, because of the inductance of the winding, for the energizing current to continue to flow therein. A circuit is provided to enable this current to thus flow, this being the phenomenon generally termed "flyback." A DC voltage is derived from the flyback current, and that DC voltage is applied to the motor winding in question during that half cycle of the input source when flyback occurs, that is to say, when the winding is not being fully energized by the input source. The action of this DC voltage on the motor is a braking action, and in particular is what is generally known as "dynamic braking." The magnitude of the DC voltage thus applied to the winding in question will determine the braking effect exerted on the rotor. That magnitude will depend upon the amount of flyback current developed, and this in turn will be dependent upon the speed of rotation of the motor rotor at the particular time involved. Thus the braking effect will vary depending upon the motor speed relative to full rated speed. The overall result is a variation in motor speed depending upon that proportion of the total flyback-produced voltage which is applied to the rotor, but with a very greatly improved starting torque characteristic for any given speed control setting.

One way in which this type of action can be accomplished is to provide half-wave rectification of the AC input to the winding in question, as by connecting a rectifier in series therewith, by providing a flyback-current path including a resistance, which path will conduct current only in the flyback direction, and by electrically connecting the winding to an appropriate point on the flyback resistance. During one-half cycle of the input AC the flyback circuit will be blocked and full line voltage will be applied to the winding. During the other half-cycle of the input voltage line current will flow through the flyback circuit, developing a voltage only a part of which will be applied to the winding for energization. In addition a flyback current will flow through the flyback circuit, the magnitude of which will be dependent upon the speed of the motor relative to its rotational speed at the average value of input voltage; the higher the speed the less will be the flyback current developed. The passage of the flyback current through the resistor in the flyback circuit will develop a voltage in the latter, and when that voltage is applied to the winding a corresponding dynamic braking effect will result. The action of this dynamic braking voltage superimposed upon the normal braking tendency of the motor during those half-cycles when AC energization is diminished or cut off from the winding will result in speed control with but a minimal reduction in starting torque.

In general it may be stated that the system of the present invention is most effective with induction motors having medium or high electrical resistance rotors, with the degree of speed controllability decreasing markedly as the rotor resistance moves into the low resistance range. The invention, however, is applicable to appropriate induction motors of single or multiple phase, and of such different types as shaded pole and permanent split capacitor.

Figure 9:
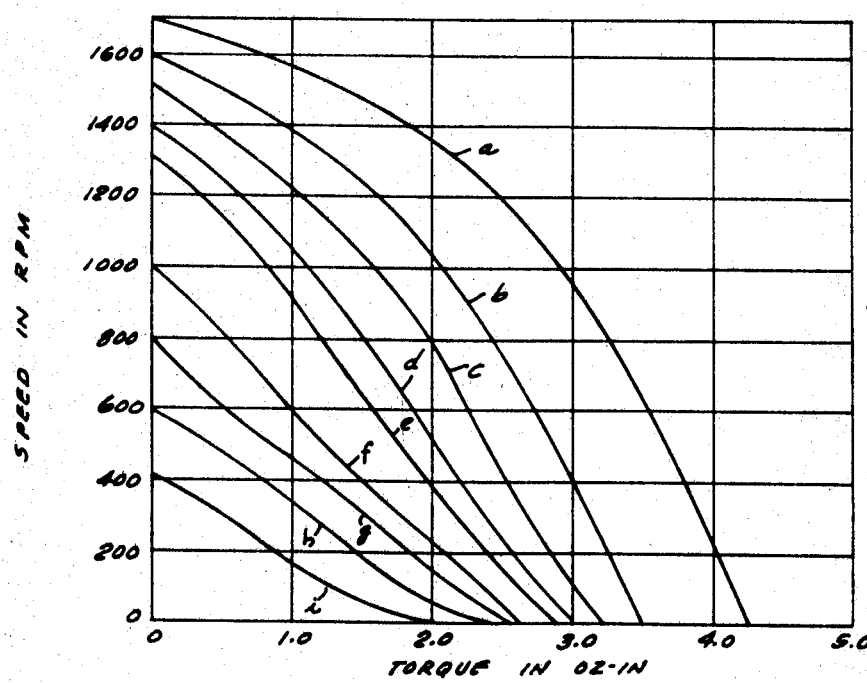

To the accomplishment of the above, and to such other objects as may hereinafter appear, the present invention relates to a system for speed control of induction motors, as defined in the appended claims and as described in this specification, taken together with the accompanying drawings, in which:

FIG. 1 is a circuit diagram showing the system of the present invention in use in conjunction with a permanent split capacitor type induction motor and providing for two-speed operation;

FIG. 2 discloses a circuit similar to that of FIG. 1 but providing for substantially continuous speed control over a range of speeds;

FIG. 3 discloses a modification of the circuit of FIG. 2;

FIG. 4 discloses yet another modification of the circuit of FIG. 2;

FIG. 5 discloses a circuit similar to that of FIG. 2 but used in conjunction with a shaded pole-type induction motor having but a single winding;

FIG. 6 discloses a modification of the present invention as used in connection with a two-phase induction motor;

FIG. 7 discloses a modification of the instant system as used in a three-phase induction motor;

FIG. 8 is a graphical representation of a typical family of speed-torque curves for a permanent split capacitor-type induction motor in which speed control is achieved by means of varying the AC voltage, as in the prior art; and FIG. 9 is a graphical representation of a typical family of speed-torque curves for a permanent split capacitor-type induction motor of FIG. 8, but in which speed control is accomplished in accordance with the instant invention.

In FIG. 1 there is schematically disclosed an induction motor comprising a rotor 2 and a pair of field windings 4 and 6, the winding 4 being connected in series with capacitor 8. Leads 10 and 12 respectively connect the upper and lower ends of the windings 4 and 6 to the terminals 14 and 16 of an AC voltage source. What is defined, as thus far described, is a conventional permanent split capacitor-type induction motor which will, for a given voltage applied across the terminals 14 and 16, operate at a corresponding no-load speed, the speed of operation of the motor decreasing as load is applied thereto. The characteristics of such a motor having a rotor comprising brass conductive bars connected at each end by brass end rings, and therefore defining a rotor of medium or high electrical resistivity, are shown in FIG. 8. To produce a variation in no-load speed between 1,700 r.p.m. and 600 r.p.m. requires a variation in input AC voltage from 115 volts to 10 volts. The starting or stalling torque of the motor when operated at a no-load speed of 600 r.p.m. is less than 0.5 ounce-inch, and a starting or stalling torque of 2 ounce-inch involves a no-load speed of almost 1500 r.p.m. Hence it will be apparent that although no-load speed control is produced through variation of the AC input voltage, the starting torque characteristics of the motor when operated at reduced AC voltage are quite inferior. It will also be appreciated by those skilled in the art that apparatus effective to reduce an AC input voltage from 115 volts to 10 volts will necessarily be bulky and costly.

In accordance with the present invention a rectifier 18 is connected between lead 10 and at least one of the windings 4 and 6 of the motor. As shown in FIG. 1 the rectifier 18 is connected between point 20 on lead 10 and point 21 at the upper end of the winding 6. The winding 4, connected in series with the capacitor 18, is unaffected by the rectifier 18. Connected between the leads 10 and 12, and in parallel with the winding 6 and the rectifier 18, is a second rectifier 22 and a pair of resistors 24 and 26 all connected in series with one another. The rectifier 22 is poled oppositely to the rectifier 18, so that each will be conductive on alternate half-cycles of the AC input applied to the terminals 14 and 16. A switch 28 is provided having terminals 30 and 32, to which switch arm 34 is selectively connectable. The terminal 32 is connected by lead 38 to point 40 between the resistors 24 and 26. The switch arm 34 is connected by lead 40 to point 21.

The operation of the circuit of FIG. 1 is as follows: When the switch 28 is actuated so that the switch arm 34 connects with terminal 30, the rectifier 18 is bypassed and the motor functions in conventional fashion, with AC being applied undiminished and equally to both of the windings 4 and 6 on both half-cycles of the input voltage. The motor will then operate at normal rated speed. When the switch 28 is shifted to its position shown in FIG. 1, with the switch arm 34 connected to terminal 32, the speed of the motor will be reduced because of the following mode of operation: During the half-cycle of the input voltage when the rectifier 18 is conductive the full input voltage will be applied to the winding 6, and the motor will function in conventional fashion. On the next half cycle of the input voltage, when the rectifier 18 is non-conductive, the rectifier 22 will conduct, and the input voltage will be applied across the resistors 24 and 26. Those resistors will function as a voltage divider and only a predetermined fraction of the actual input voltage, as determined by the ratio between the resistances of the resistors 24 and 26, will be applied to the winding 6. This reduction in energization of the winding 6 during every other half cycle of the input will result in a reduction in motor speed, brought about in a fashion comparable to the AC input voltage reduction of prior art systems. This, as we have seen, is accompanied by an undesirable reduction in starting torque.

In the present system this starting torque reduction is very greatly minimized because of certain additional speed-reducing effects. When the winding 6 is energized to a lesser degree during the half cycle when the rectifier 22 is conductive than during the half cycle when the rectifier 18 is conductive the current flowing in the winding 6 will nevertheless, because of the inductance of that winding, tend to continue to flow in the same direction and in undiminished magnitude. The rectifier 22 and the resistors 24 and 26 provide a path for that current; in conventional terminology they define a flyback circuit. The flyback current flowing through the resistors 24 and 26 will produce a voltage which, when applied to the winding 6 via the lead 38, switch 28 and lead 40, will produce a dynamic braking effect. It is believed that it is this dynamic braking effect which results in the greatly improved speed-torque characteristics which characterize the operation of the system of the present invention.

The circuit of FIG. 1 provides for motor operation at only two speeds. With the circuit modified as shown in FIG. 2, in which the resistors 24 and 26 are substituted for by a potentiometer 24' having a slider 40' controllably movable therealong, substantially continuous speed control over an appreciable range can be achieved by changing the position of the slider 40' along the resistor 24'. The closer the slider 40' is located relative to the upper end of the potentiometer 24', the higher will be the speed of rotation of the motor, and when the slider 40' is completely at the top of the potentiometer 24' the motor will operate at normal rated speed, the circuit then being essentially the same as that of FIG. 1 when the switch arm 34 engages the contact 30.

FIG. 9 is a graphical representation of a family of curves for the same motor as was involved in the taking of the data for FIG. 8, but with a control circuit of the type of FIG. 2, the potientiometer 24' having a value of 1000 ohms. In FIG. 9 the curve $a$ represents the setting of the slider 40' at its upper limit so that essentially the full 115 volts is applied to the motor. The curves $b$, $c$, $d$, $e$, $f$, $g$, $h$, and $i$ represent the speed torque characteristics of the motor with the slider 40' progressively moved down along the potentiometer 24'. From FIG. 9 it will be noted that speed control between 1700 r.p.m. and 400 r.p.m. is achieved, with the starting torque being greater than 2 ounce-inches in all cases. The 1300 r.p.m. range thus achieved is to be compared with the 200 r.p.m. range achievable, with comparable starting torque requirements, with the prior art speed control arrangements.

The circuit of FIG. 2 provides approximately a 4:1 speed control with a minimum starting torque of approximately ½ of the full starting torque. In the circuit of FIG. 3, which differs from that of FIG. 2 by having the rectifier 18 connected in series with both of the windings 4 and 6, an approximately 8:1 speed control is achieved with a minimum starting torque of approximately one quarter of the full starting torque.

FIG. 4 illustrates a modification of the circuit of FIG. 2 in which the rectifier 18 is associated with the coil 6 connected in series with the capacitor 8. The circuit of FIG. 4 has the advantage, when compared with the circuit of FIGS. 2 and 3, that it consumes less line power so that a lower wattage potentiometer can be used. An approximately 2:1 speed control is achieved with a minimum starting torque of approximately one-quarter of the full starting torque. This circuit may be modified by eliminating the rectifier 18, thereby producing effective speed control solely through the dynamic braking effect of the voltage derived in the flyback circuit. With this modification a somewhat higher resistance for the potentiometer 24 is called for than when the rectifier 18 is employed, and there is some lessening in the speed control characteristics of the system, but the results obtained are still significantly superior to the prior art method of merely varying the magnitude of the applied AC voltage, particularly with regard to the maintaining of a high starting torque.

FIG. 5 illustrates the system of the present invention as applied to a shaded pole type induction motor having but a single winding 6, the rectifier 18 being connected in series therewith and the point 22 at the upper end of the winding 6 being connected to the slider 40' of potentiometer 24'. Approximately a 8:1 speed control is thereby provided with a minimum starting torque of approximately three-quarters of the full starting torque.

FIG. 6 illustrates the present invention as applied to a two-phase induction motor having windings 4 and 6, the winding 4 being connected across input terminals 14a and 14 and the winding 6 being connected between input terminals 14 and 16 in series with rectifier 18, the two input phases being connected respectively across terminals 14, 16 and 14, 14a. In FIG. 7 the invention is shown as embodied in a three-phase induction motor having windings 4, 4' and connected in a conventional Y network, the winding 6 being connected in series with rectifier 18 to terminal 14, the winding 4 being connected to terminal 16 and the winding 4' being connected to terminal 14a. The three phases of the input voltage are applied respectively across terminals 14–16, 14–14a, and 14a–16. With the circuits of FIGS. 6 and 7 approximately 6:1 speed control with a minimum starting torque of approximately one-half the full starting torque has been achieved.

From the above it will be seen that effective and easily adjustable speed control is achieved, in accordance with the present invention, by means of simple and inexpensive circuitry which may be incorporated into or used in conjunction with existing equipment without any appreciable increase in size or weight, and that in addition the operating characteristics of the speed control, and particularly the range of speed control achievable while maintaining starting torque at a high level, is far superior to that which has previously been thought attainable even with much more expensive and bulky control circuitry.

While in most of the embodiments here specifically illustrated potentiometers 24' are employed to provide substantially continuous speed control, it will be understood that discrete resistors and appropriate switching mechanism, manually or automatically operated, could be provided to produce stepped speed control where required or desired. Variations may be made in the specific nature of the induction motor and of the control circuits, all as will be clear to those skilled in the art, without departing from the spirit of the invention as defined in the following claims.

I claim:
1. A speed control system for an induction motor comprising a field winding electrically connected to an AC source, said system comprising a first rectifying means connected in series with said winding, and, in shunt with said winding, a series circuit comprising a second rectifying means and a resistance, said second rectifying means being oppositely poled relative to said first rectifying means, whereby said rectifying means are conductive respectively on alternate half cycles of said AC source, and an electric connection between a first point located between said winding and said first rectifying means and a second point located on said resistance.

2. In the speed control system of claim 1, means for separately moving said second point along said resistance, thereby controllably to vary the speed of said motor.

3. In the speed control system of claim 1, a by-pass connection around said first rectifying means, said by-pass connection including a switch.

4. In the speed control system of claim 1, means for selectively electrically connecting said first point to said second point and to a third point on the other side of said first rectifying means from said second point.

5. A speed control system for an induction motor comprising a field winding electrically connected to an AC voltage source, said system comprising means for applying voltage at least of a given magnitude from said source to said winding during at least a part of a given half of the AC cycle but not during the other half of said cycle, means for providing flyback for said motor during said other half of said cycle, and means for deriving a voltage from said flyback means and applying it to said winding during said other half of said cycle.

6. In the speed control system of claim 5, means for controllably varying over a range of voltages the derived voltage applied to said winding, thereby controllably to vary the speed of said motor.

7. In the speed control system of claim 5, switch means operatively connected between said source and said winding and effective when actuated to apply voltage from said source to said winding during said other half of said cycle.

8. In the speed control system of claim 5, means for selectively connecting said winding to said source and to said voltage deriving means.

9. In the speed control system of claim 5, means for applying voltage from said source to said winding, but in diminished amount relative to said given magnitude, during said other half of said cycle.

10. In the speed control system of claim 9, means for controllably varying over a range of voltages the derived voltage and the diminshed voltage applied to said winding, thereby controllably to vary the speed of said motor.

11. A speed control system for an induction motor comprising a field winding electrically connected to an AC voltage source, said system comprising means for applying voltage from said source to said winding having a greater magnitude during one half of the AC cycle than during the other half thereof, means for providing flyback for said motor during said other half of said cycle, and means for deriving a voltage from said flyback means and applying it to said winding during said other half of said cycle.

12. In the speed control system of claim 11, means for controllably varying over a range of voltages the derived voltage applied to said winding, thereby controllably to vary the speed of said motor.

References Cited

UNITED STATES PATENTS

| | | | |
|---|---|---|---|
| 2,304,604 | 12/1942 | Schweitzer | 318—227 XR |
| 2,419,431 | 4/1947 | Williams | 318—212 XR |
| 2,642,555 | 6/1953 | Warner | 318—228 XR |
| 2,664,531 | 12/1953 | Nakasone | 318—212 XR |
| 2,683,845 | 7/1954 | Geyger | 318—212 |
| 3,286,150 | 12/1966 | Wilson et al. | 318—245 |

ORIS L. RADER, Primary Examiner

U.S. Cl. X.R.

318—212, 230